(12) United States Patent
Uchida et al.

(10) Patent No.: US 7,321,177 B2
(45) Date of Patent: Jan. 22, 2008

(54) SYNCHRONOUS ELECTRIC MOTOR (75) Inventors: Hiroyuki Uchida, Yamanashi (JP);
 Tomonaga Yamamoto, Fujiyoshida
 (JP); Takuya Maeda, Yamanashi (JP);
 Hiroshi Kougami, Yamanashi (JP)

(73) Assignee: Fanuc Ltd, Yamanashi (JP)

( * ) Notice: Subject to any disclaimer, the term of this
 patent is extended or adjusted under 35
 U.S.C. 154(b) by 24 days.

(21) Appl. No.: 11/165,403

(22) Filed: Jun. 24, 2005

(65) Prior Publication Data

US 2006/0017345 A1 Jan. 26, 2006

(30) Foreign Application Priority Data

Jun. 24, 2004 (JP) ............... 2004-186638

(51) Int. Cl.
 *H02K 1/14* (2006.01)
 *H02K 1/27* (2006.01)
 *H02K 21/14* (2006.01)
 *H02K 21/16* (2006.01)

(52) U.S. Cl. ............ 310/216; 310/156.07; 310/156.46;
 310/156.49; 310/156.53

(58) Field of Classification Search ........... 310/156.35,
 310/156.41, 156.43, 156.53, 156.56, 216,
 310/156.46, 156.48, 156.49, 156.07
 See application file for complete search history.

(56) References Cited

U.S. PATENT DOCUMENTS 5,929,547 A * 7/1999 Kim ...................... 310/156.53

6,441,524 B2 * 8/2002 Kaneko et al. ........ 310/156.45

FOREIGN PATENT DOCUMENTS

| DE | 222 745 | 5/1985 | | |
| DE | 199 15 664 | 10/2000 | | |
| EP | 0 917 272 | 5/1999 | | |
| EP | 0 955 714 | 11/1999 | | |
| JP | 08275419 | * 10/1996 | ............ | 310/156.53 |
| JP | 11-243653 | 9/1999 | | |
| JP | 11243653 | * 9/1999 | ............ | 310/156.41 |
| JP | 2001-095182 | 4/2001 | | |
| JP | 2002-010541 | 1/2002 | | |
| JP | 2003088019 | * 3/2003 | ............ | 310/156.53 |

* cited by examiner

*Primary Examiner*—Tran Nguyen
(74) *Attorney, Agent, or Firm*—Drinker Biddle & Reath LLP (57) ABSTRACT

A synchronous electric motor including a rotor having a rotation axis, and a stator surrounding the rotor through a gap. The rotor includes a rotor core having an outer circumferential surface extending about the rotation axis and a plurality of permanent magnets attached to the rotor core to form plural poles along the outer circumferential surface of the rotor core. The outer circumferential surface of the rotor core is provided, at each pole, with a contour deviating from a circular arc and bulging out in a radial outward direction, as seen in a cross-section perpendicular to the rotation axis. The permanent magnets include a plurality of magnet sets individually assigned to the plural poles, each set including two or more permanent magnets. The contour of the outer circumferential surface of the rotor core, at each pole, has at least partially a shape represented by a hyperbolic cosine function or a secant function.

9 Claims, 10 Drawing Sheets

PRIOR ART

SYNCHRONOUS ELECTRIC MOTOR

BACKGROUND OF THE INVENTION

1. Field of the Invention

The present invention relates to a synchronous electric motor. The present invention also relates to a rotor of a synchronous electric motor.

2. Description of the Related Art

In an inner-rotor type synchronous electric motor, it is known that the outer circumferential surface of the rotor core is provided, at each of the plural poles formed in the rotor, with a contour deviating from a circular arc and bulging out in a radial outward direction, as seen in a cross-section perpendicular to a rotation axis. In the synchronous electric motor having the above rotor, a generated torque depends on the dimension of the gap between the circumferentially center region of the core outer surface in each pole of the rotor and the inner circumferential surface of a stator core (this gap being hereinafter referred to as "a center gap"). In other words, as the center gap is reduced, the torque is increased.

On the other hand, an inductance in the synchronous electric motor having the above rotor depends on the dimension of a gap between each of the circumferentially opposite lateral regions of the core outer surface in each pole of the rotor and the inner circumferential surface of the stator core (this gap being hereinafter referred to as "a lateral gap"). In other words, as the lateral gap is increased, the inductance is reduced. Then, as the inductance is reduced, the counter electromotive force generated during high-speed rotation of the rotor decreases and, as a result, the torque (or power) during the high-speed rotation increases. The reduction in inductance also reduces the energy consumption.

Therefore, in a synchronous electric motor, it has been generally required to optimize the shape of the outer circumferential surface of a rotor core at each pole of a rotor, so as to increase a torque and to decrease an inductance to improve the energy efficiency.

Japanese Unexamined Patent Publication (Kokai) No. 2002-010541 (JP-A-2002-010541) discloses a synchronous electric motor having an improved correlation between torque and inductance, in which the contour of a core outer circumferential surface at each pole of a rotor is formed into a bulging shape and in a curve represented mainly by a hyperbolic cosine function, and it is thus possible to establish a high torque at both a high-speed and a low-speed rotation. This patent Document also discloses a synchronous electric motor in which the contour of the core outer circumferential surface at each pole of a rotor is formed into a bulging shape and in a curve represented mainly by a secant function.

Figure 8:
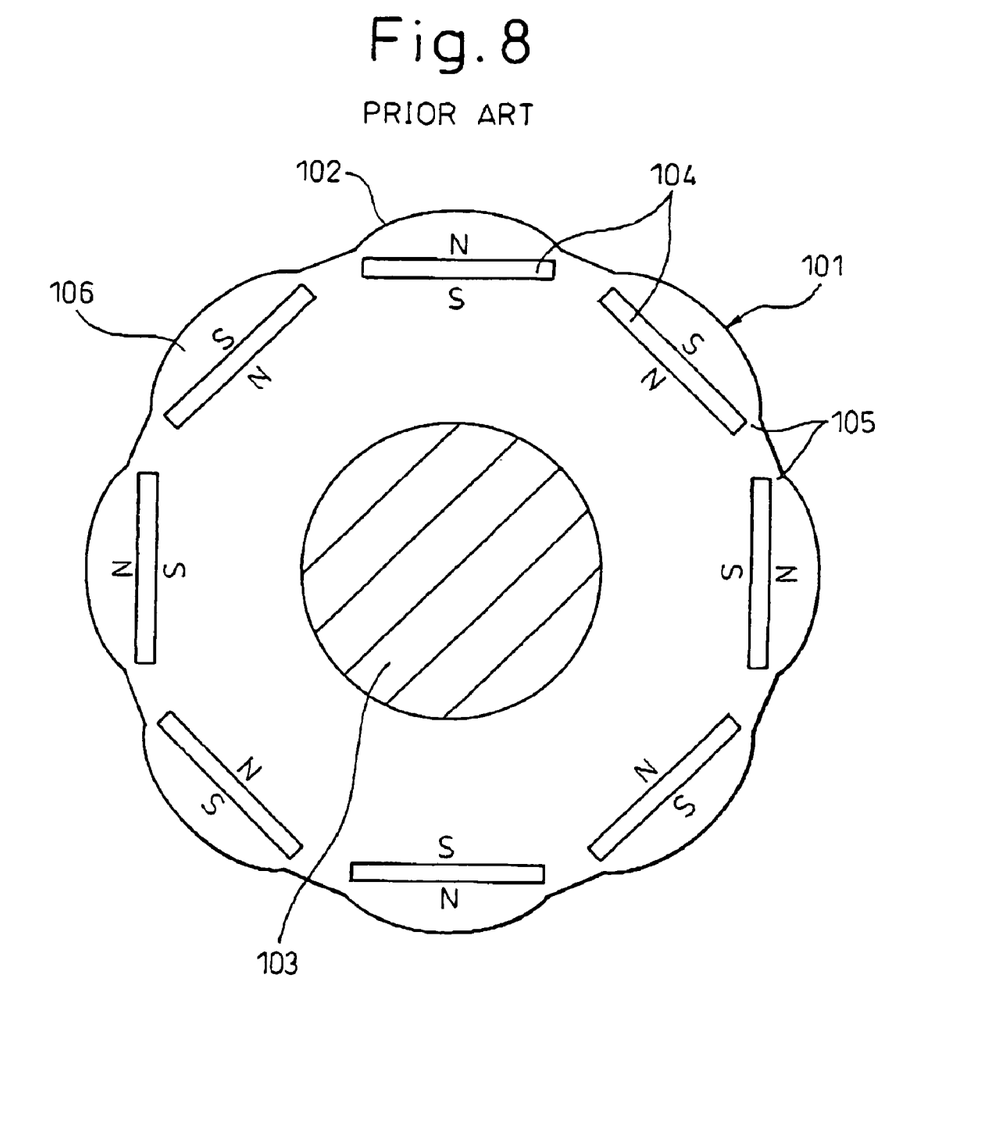
FIG. 8 is a cross-sectional view showing a rotor of a conventional synchronous electric motor.

FIG. 8 shows an example of a rotor which adopts a bulging shape represented mainly by a hyperbolic cosine function as the contour of the core outer circumferential surface at each pole of the rotor. In the illustrated rotor, a rotor core 101 has several poles alternately formed in a circumferential direction along the outer circumferential surface 102, and is coaxially mounted onto a shaft 103. The contour of the outer circumferential surface 102 at each pole of the rotor core 101 is a bulging shape represented by a hyperbolic cosine function. The rotor core 101 is provided with plate-like permanent magnets 104, embedded therein and extending in a direction orthogonal to the radial direction of the core, one-by-one for the respective poles. Due to the bulging shape of the contour of the outer circumferential surface 102 at each pole of the rotor core 101, thinner portions 105 of the rotor core 101 are formed between the permanent magnets 104 of adjoining poles. The thinner portions 105 cooperate with a bulging portion 106 radially outside of the permanent magnet 104 to support the permanent magnet 104 against a centrifugal force.

Figure 9:
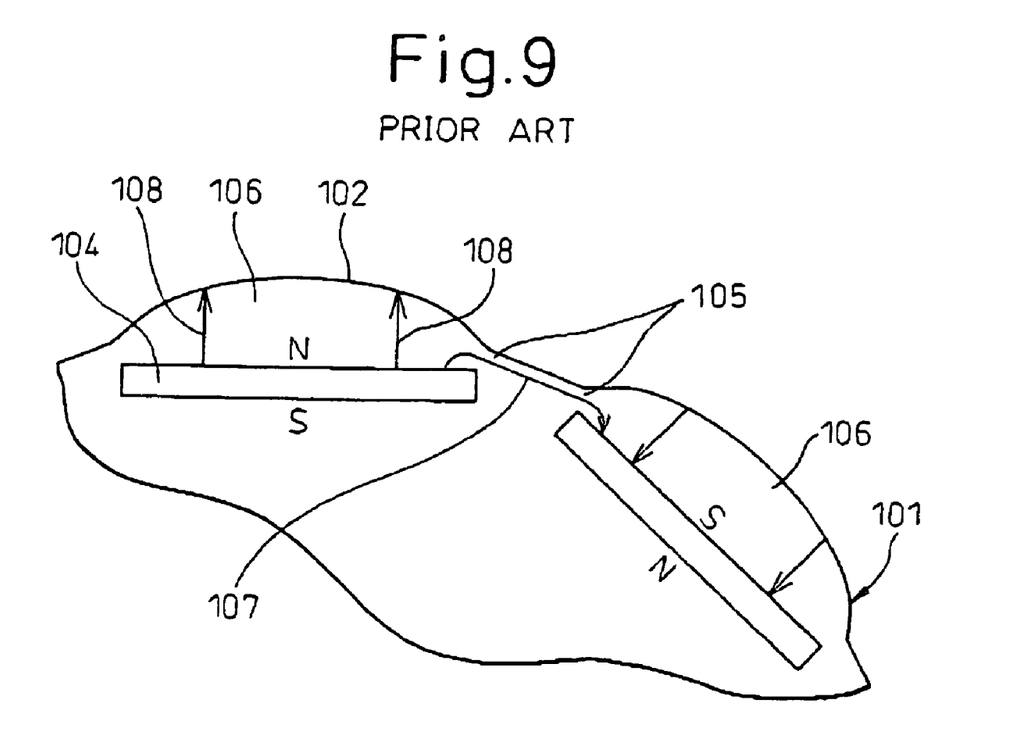
FIG. 9 is a partially enlarged sectional view showing a leakage magnetic flux and an effective magnetic flux in the rotor of FIG. 8.

As shown in FIG. 9, the magnetic flux coming out from one permanent magnet 104 is divided into a magnetic flux passing in the circumferential direction through the thinner portions 105 to the adjoining permanent magnet 104, and a magnetic flux passing in a radial direction through the bulging portion 106 to the stator (not shown). The magnetic flux passing through the thinner portions 105 is a leakage magnetic flux 107 that does not contribute to the generation of the torque, while the magnetic flux passing through the bulging portion 106 is an effective magnetic flux 108 that contributes to the generation of the torque. The effective magnetic flux 108 from the permanent magnet 104 usually corresponds to the remaining parts of a total magnetic flux at the instant when the thinner portion 105 is saturated with the leakage magnetic flux 107. Therefore, by decreasing the leakage magnetic flux 107 passing through the thinner portions 105, it is possible to increase the effective magnetic flux 108 flowing toward the stator. In order to decrease the leakage magnetic flux 107 passing through the thinner portions 105, it is advantageous to reduce the dimensions of the thinner portions 105.

However, during the rotation of the rotor, a centrifugal force, produced mainly in each permanent magnet 104 and the bulging portion 106 radially outside thereof, may be concentrated to the thinner portions 105, and thereby the rotor core 101 may be broken. Therefore, to ensure a sufficient rotor strength, it is required to increase the dimensions of the thinner portions 105 in the rotor core 101. Thus, for the thinner portion 105 provided in the rotor core 101, it is required to decrease the dimension thereof for increasing the torque, while it is required to increase the dimension thereof to ensure strength of the rotor.

Figure 10:
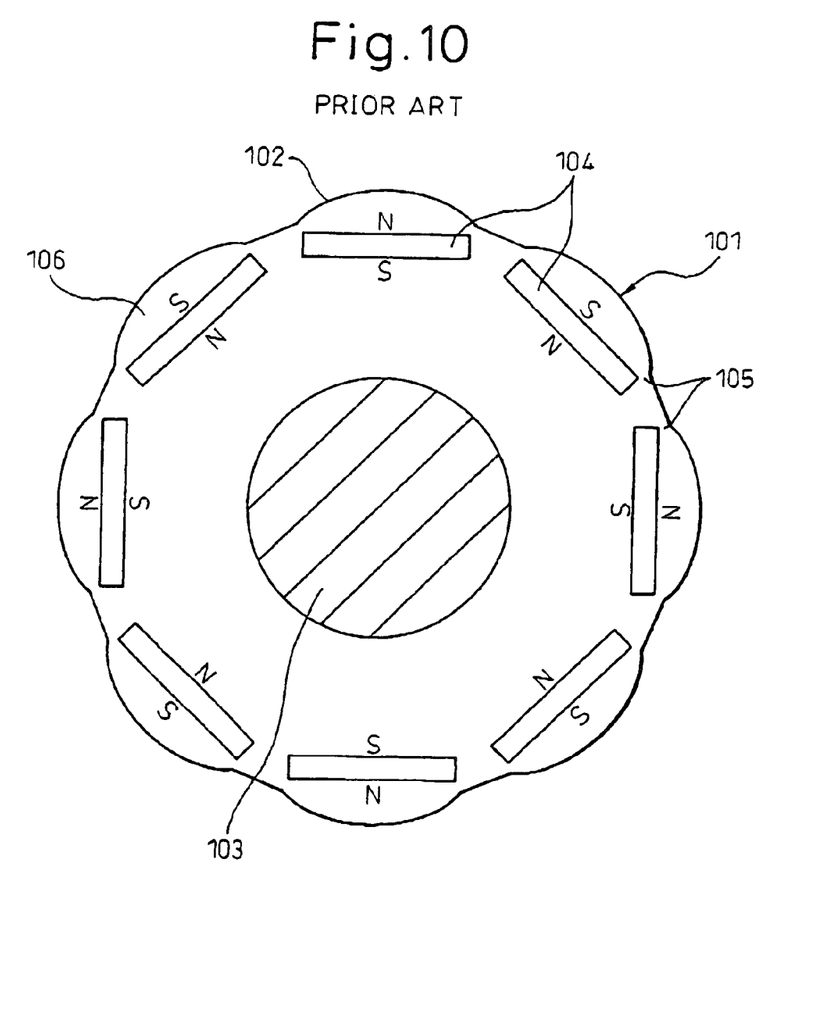
FIG. 10 is a cross-sectional view showing a rotor of another conventional synchronous electric motor.

In this connection, as shown in FIG. 10, it is also possible to increase the torque by increasing the thickness of the permanent magnet 104, without changing the dimensions of the thinner portions 105 in the rotor core 101. In this configuration, a magnetic flux increases in accordance with the increase in thickness of the permanent magnet 104 and, because the amount of the leakage flux 107 passing through the thinner portions 105 is not changed, the effective magnetic flux 108 passing through the bulging portion 106 increases, which results in an increase in torque. In this configuration, however, the increase in torque raise is not significant as compared to the increase in volume of the respective permanent magnets 104. Therefore, it is required to provide a configuration permitting the torque to be increased more efficiently.

Japanese Unexamined Patent Publication (Kokai) No. 11-243653 (JP-A-11-243653) discloses an electric motor in which a rotor includes a rotor core with a circular outer circumferential surface in cross-section and several permanent magnets embedded in the rotor core with two or more magnets per one pole. In this electric motor, each pole of the rotor is composed of the several permanent magnets having a unique configuration of magnet array, so as to increase the difference between the d-axis inductance and the q-axis inductance, and thereby it is possible to increase the reluctance torque of the electric motor. An electric motor having the similar configuration is also disclosed in Japanese Unexamined Patent Publication (Kokai) No. 2001-095182 (JP-A-2001-095182). However, neither of the patent Documents teach nor describe a configuration such that the contour of the core outer circumferential surface at each pole of the rotor is formed into a shape deviating from a circular arc so as to permit the inductance to be decreased.

SUMMARY OF THE INVENTION

It is an object of the present invention to provide an inner-rotor type synchronous electric motor, which includes a rotor capable of efficiently increasing a torque as well as of decreasing an inductance so as to increase energy efficiency.

In order to accomplish the above object, the present invention provides a synchronous electric motor comprising a rotor having a rotation axis; and a stator surrounding the rotor through a gap; wherein the rotor includes a rotor core having an outer circumferential surface extending about the rotation axis and a plurality of permanent magnets attached to the rotor core to form plural poles along the outer circumferential surface of the rotor core; wherein the outer circumferential surface of the rotor core is provided, at each of the plural poles, with a contour deviating from a circular arc and bulging out in a radial outward direction, as seen in a cross-section perpendicular to the rotation axis; and wherein the plurality of permanent magnets include a plurality of magnet sets individually assigned to the plural poles, each set including two or more permanent magnets.

In the above synchronous electric motor, the contour of the outer circumferential surface of the rotor core, at each of the plural poles, may have, at least partially, a shape represented by a hyperbolic cosine function, as seen in the cross-section perpendicular to the rotation axis.

Alternatively, the contour of the outer circumferential surface of the rotor core, at each of the plural poles, may have, at least partially, a shape represented by a secant function, as seen in the cross-section perpendicular to the rotation axis.

Each of the plurality of magnet sets may include a pair of permanent magnets having a V-shaped configuration and converging toward each other at portions thereof close to the rotation axis; and the pair of permanent magnets may be provided, on surfaces thereof obliquely facing to each other, with a mutually identical magnetic pole.

In this arrangement, each of the plurality of magnet sets may further include an additional permanent magnet disposed between the pair of permanent magnets; and the additional permanent magnet may be provided, on a surface thereof close to the outer circumferential surface of the rotor core, with a magnetic pole identical to the magnetic pole of the surfaces of the pair of permanent magnets.

The present invention also provides a rotor of a synchronous electric motor comprising a rotor core provided on an outer circumferential surface thereof with a contour represented by a hyperbolic cosine function or a secant function; and a plurality of permanent magnets embedded in the rotor core, two or more of the permanent magnets being provided per one pole of the rotor core.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below, in detail, with reference to the accompanying drawings. In the drawings, the same or similar components are denoted by common reference numerals.

Figure 1:
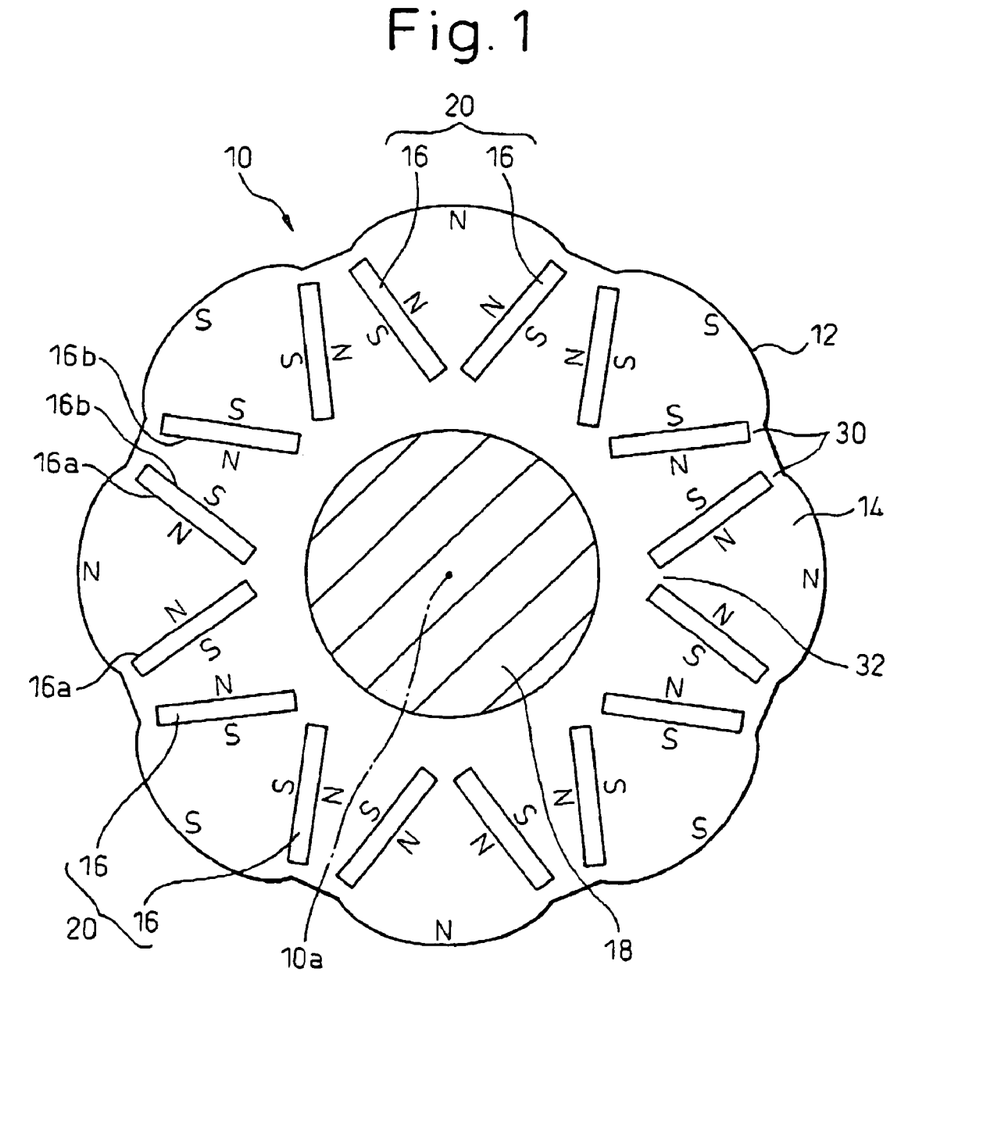
FIG. 1 is a cross-sectional view showing a rotor of a synchronous electric motor according to the first embodiment of the present invention.

Referring to the drawings, FIG. 1 shows a rotor 10 of a synchronous electric motor, according to the first embodiment of the present invention, in a cross-section perpendicular to a rotation axis 10a. The rotor 10 includes a rotor core 14 having an outer circumferential surface 12 extending about the rotation axis 10a as the center thereof, and several permanent magnets 16 attached to the rotor core 14 to form several poles (N-poles and S-poles) along the outer circumferential surface 12 of the rotor core 14. The rotor core 14 is coaxially mounted to a shaft 18, and in this state, the permanent magnets 16 are disposed around the shaft 18 in a balanced arrangement.

The outer circumferential surface 12 of the rotor core 14 is provided, at each of the several poles, with a contour deviating from a circular arc and bulging out in a radial outward direction, as seen in the cross-section perpendicular to the rotation axis 10a. The permanent magnets 16 are functionally divided into a plurality of magnet sets 20 individually assigned to the poles, each set 20 including two or more permanent magnets 16. The magnet sets 20 are composed of the permanent magnets 16 having identical constitutions, which are combined in a common relative arrangement.

In the illustrated embodiment, four N-poles and four S-poles are alternately formed in a circumferential direction along the outer circumferential surface 12 of the rotor core 14. The contour of the outer circumferential surface 12, at each of the N-poles and the S-poles, has, at least partially, a shape represented by a hyperbolic cosine function, as seen in the cross-section perpendicular to the rotation axis 10a. In the illustrated configuration, a portion of the outer circumferential surface 12 corresponding to each pole is provided substantially in its entirety with a bulging shape represented by the hyperbolic cosine function. Alternatively, the portion of the outer circumferential surface 12 corresponding to each pole may be constructed such that the circumferentially center region thereof and the opposite lateral regions adjoining the center region have the bulging shape represented by the hyperbolic cosine function, and circumferentially opposite end regions have a shape represented by the other curve.

Figure 2:
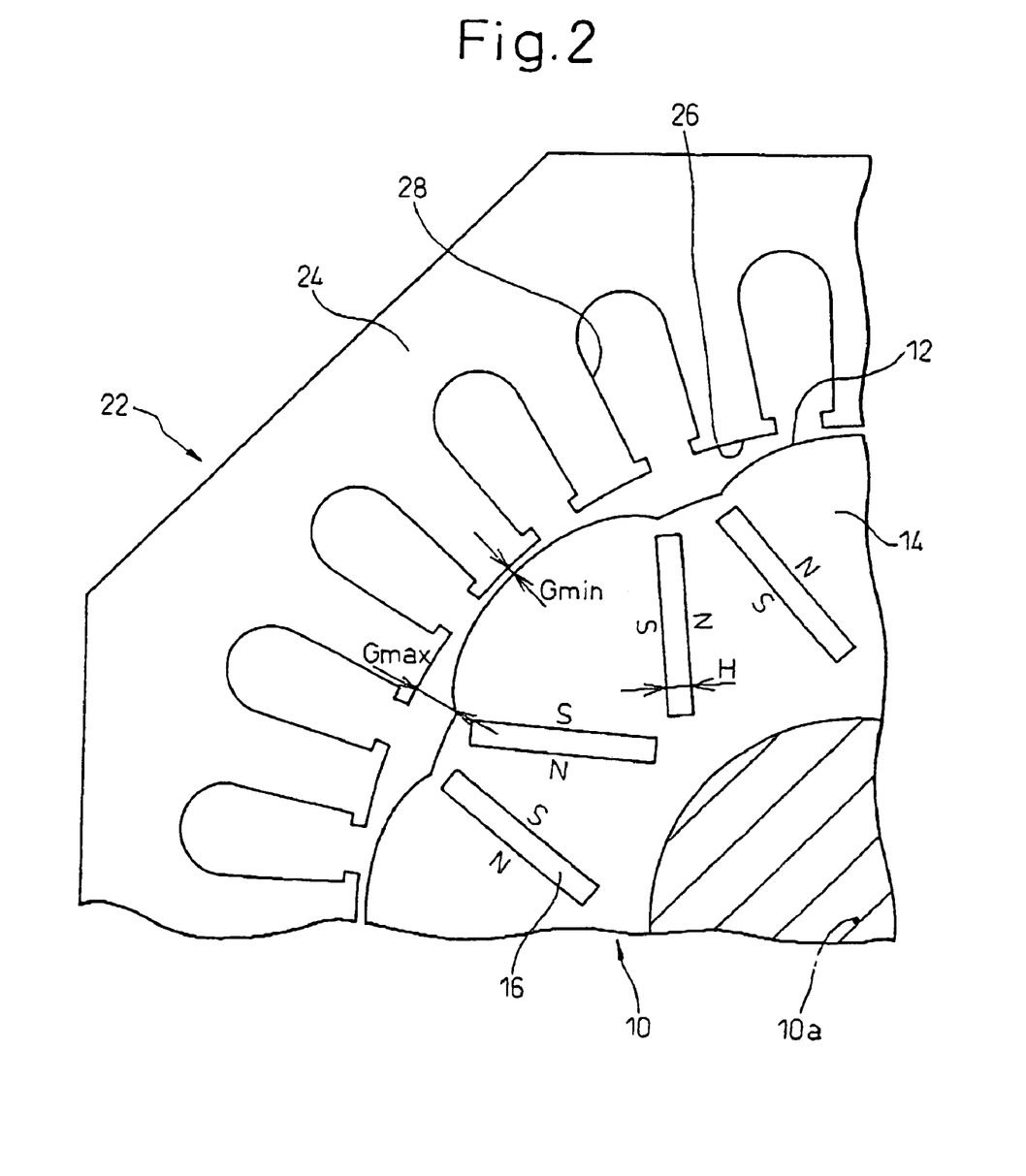
FIG. 2 is a partially enlarged sectional view showing dimensions and positional relationships of the components of a rotor and a stator, in the synchronous electric motor having the rotor of FIG. 1.

As shown in FIG. 2, the rotor 10 is contained, rotatably through a gap, in the interior space of a stator 22, so as to compose the synchronous electric motor. The stator 22 includes a tubular stator core 26 having a prism-like outer shape and a cylindrical inner circumferential surface 24. Along the inner circumferential surface 24 of the stator core 26, a plurality of slots 28 are disposed at regular intervals in a circumferential direction and are recessed to extend in a radial direction over the axially entire length of the stator core. A not-shown excitation coil is fitted in each slot 28.

The contour shape of the outer circumferential surface 12 at each pole of the rotor 10, as seen in the illustrated cross-section, may be represented by the following formula including a hyperbolic cosine function in which the position of the rotation axis 10a is defined as an origin:

$$R = A - B \times \cosh(C\theta) = A - B \times (e^{C\theta} + e^{-C\theta})/2$$

In the above formula, R is a distance between the outer circumferential surface 12 and the origin, 2θ is a center angle for one pole, A is a value determined on the basis of the distance between the origin and the inner circumferential surface 24 of the stator core (i.e., the inner diameter of the stator core 26), B is a value determined on the basis of the center gap (i.e., a minimum gap $G_{min}$) in each pole of the rotor, and C is a value for determining the curvature of the hyperbolic cosine function.

When the bulging shape represented by the above hyperbolic cosine function is applied to the outer circumferential surface 12 of the rotor core 14 at each pole of the rotor, the inductance of the synchronous electric motor is effectively decreased, and energy efficiency is increased. Therefore, if the inventive motor is designed to have an inductance identical to that of the conventional motor, it is possible to increase the generated torque.

Referring again to FIG. 1, each of the several magnet sets 20 composing the plural poles of the rotor 10 includes a pair of permanent magnets 16 having a V-shaped configuration such that the magnets 16 are arranged to converge toward each other at the portions thereof close to the rotation axis 10a. The permanent magnets 16 constituting each magnet set 20 are provided, on the front surfaces 16a obliquely facing each other, with a mutually identical magnetic pole. Also, two permanent magnets 16 arranged side-by-side in the magnet sets 20 adjoining in the circumferential direction are provided, on the rear surfaces 16b facing each other, with magnetic poles different from each other. In this manner, N-poles and S-poles are formed alternately in the circumferential direction on the outer circumferential surface 12 of the rotor core 14.

Between the pair of permanent magnets 16 of each magnet set 20 and the outer circumferential surface 12 of the rotor core 14, thinner portions 30 of the rotor core 14 are formed adjacent to the outer ends of the respective permanent magnets 16 as seen in the radial direction of the rotor core 14. Also, between the pair of permanent magnets 16 of each magnet set 20, a thinner portion 32 of the rotor core 14 is formed adjacent to the inner ends of the respective permanent magnets 16 as seen in radial direction of the rotor core 14. Through-holes are formed in the rotor core 14 to be adjacent to the thinner portions 30, 32 for embedding individually the permanent magnets 16 in the rotor core 14. Thus, each permanent magnet 16 is supported firmly and securely in each through-hole, against a centrifugal force exerted during the rotation of the rotor, by the thinner portions 30, 32. The dimensions of the thinner portions 30, 32 have influence on the mechanical strength of the rotor core 14 against the centrifugal force.

As already described, a part of a magnetic flux coming out from each permanent magnet 16 is a leakage magnetic flux passing through the thinner portions 30, 32. However, the pair of permanent magnets 16 in each magnet set 20 are arranged in the V-shaped configuration, and, thereby, it is possible to increase a magnetic flux between the rotor and the stator 22 (FIG. 2), and thus to increase the generated torque.

For example, when a torque generated by the conventional rotor structure, as shown in FIG. 8, is denoted by T and a torque generated by the rotor including permanent magnets 104 having increased thicknesses, as shown in FIG. 10, is denoted by T1, the torque T1 can be analyzed and, as a result, the relationship of T1=(1+a)T is obtained. Then, when the total volume of a pair of permanent magnets 16 of each magnet set 20 in the inventive rotor 10 is equal to the volume of the permanent magnet 104 having the increased thickness of FIG. 10 and the torque T2 generated by the rotor 10 is analyzed, the relationship of T2=(1+2a)T is obtained. Thus, by adopting the rotor configuration in which a pair of permanent magnets 16 are arranged in a V-shape, it is possible to increase the torque by an amplification factor twice the amplification factor of the conventional structure including the permanent magnets 104 having increased thicknesses.

Also, in the rotor 10, the rotor core 14 is provided on the outer circumferential surface 12 with the contour shape represented by a hyperbolic cosine function at each pole, and thereby it is possible to establish a characteristic in which the magnetic flux density at each pole varies smoothly in the circumferential direction. As a result, it is possible to effectively reduce a cogging torque during the rotation of the rotor 10, as compared to the conventional rotor in which the rotor core has a cylindrical outer circumferential surface.

In this connection, in the configuration of the present invention in which the dimension of a gap between the rotor 10 and the stator 22 varies in the circumferential direction along the outer circumferential surface 12 of the rotor core 14, it is advantageous that the dimensions of respective components are set in such a manner that, as shown in FIG. 2, a gap maximum dimension $G_{max}$, a gap minimum dimension $G_{min}$, and a thickness H of each permanent magnet are defined under a relationship meeting the following formula:

$$G_{max}/(G_{max}+H) \geq \sqrt{2} \times G_{min}/(G_{min}+H)$$

The above formula representing the relationship can be derived from an experiment on the cogging torque generated during the rotation of the rotor in the synchronous electric motor.

For example, the following Table 1 shows calculated values M (mm$^2$) obtained through a predetermined formula and actually measured values Q (Nm) of cogging torques, for several different configurations of electric motors, in which the contour shape P of the outer circumferential surface of the rotor core, the inner diameter D (mm) of the stator, the thickness H (mm) of the magnet, the gap minimum value $G_{min}$ and the gap maximum value $G_{max}$ are used as parameters. In this connection, the calculated values M are obtained through the following formula:

$$M = D^2 \times \{(G_{min}+H)^2 \times (G_{max}+H)^2\}/(G_{min}^2 \times G_{max}^2)$$

TABLE 1

| P | D (mm) | H (mm) | $G_{min}$ (mm) | $G_{max}$ (mm) | M (mm²) | Q (Nm) |
|---|---|---|---|---|---|---|
| Circular arc | 54 | 2.7 | 0.5 | 0.5 | 4892236 | 7.7 |
| Hyperbolic cosine | 40 | 2 | 0.4 | 1.5 | 313600 | 0.220 |
| Hyperbolic cosine | 40 | 2 | 0.4 | 2.25 | 197363 | 0.021 |
| Hyperbolic cosine | 54 | 2.7 | 0.5 | 1.3 | 1130787 | 2.426 |
| Hyperbolic cosine | 54 | 2.7 | 0.5 | 1.9 | 700093 | 0.672 |
| Hyperbolic cosine | 54 | 2.7 | 0.7 | 1.3 | 403235 | 0.772 |
| Secant function | 54 | 2.7 | 0.5 | 1.3 | 1130787 | 2.531 |
| Secant function | 54 | 2.7 | 0.5 | 1.9 | 700063 | 1.118 |
| Secant function | 54 | 2.7 | 0.5 | 3 | 431176 | 0.562 |

On the basis of the experimental result shown in the above Table 1, a regression analysis is conducted to the relationship between the calculated values M and the actual cogging torques Q (Nm), and thereby the following relation is obtained:

$$Q \propto D^2 \times \{(G_{min}+H)^2 \times (G_{max}+H)^2\} / (G_{min}^2 \times G_{max}^2)$$

Figure 3:
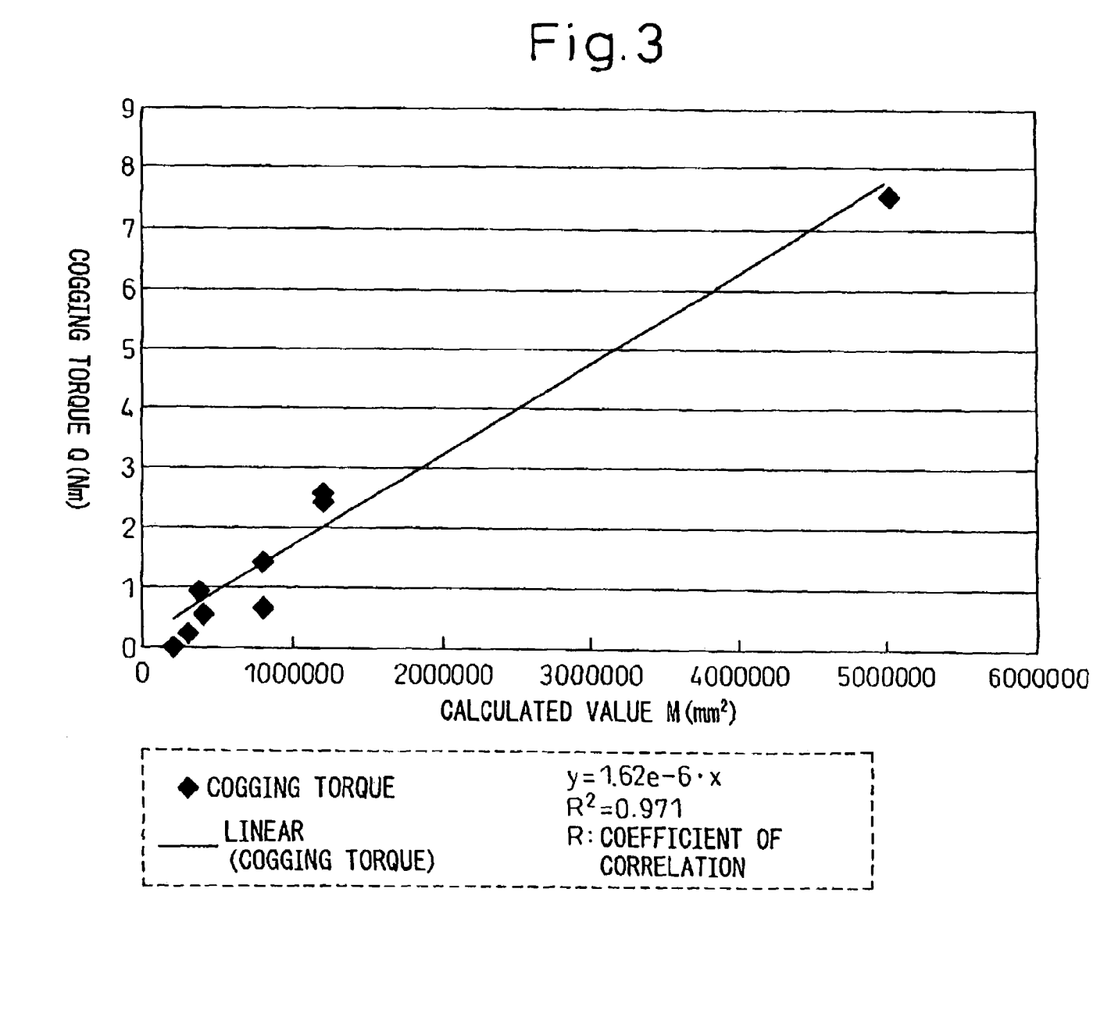
FIG. 3 is a view showing a correlation between the dimensions and positional relationships of FIG. 2 and a cogging torque.

The above formula shows the correlation established between M and Q. FIG. 3 shows the correlation between M and Q.

Taking the above correlation into account, the cogging torque generated from the rotor, in which a hyperbolic cosine function or a secant function is used for the contour shape of the outer circumferential surface 12 of the rotor core 14, is reduced to at most half of that in the conventional rotor in which the contour shape of the outer circumferential surface of the rotor core is represented by a circular arc (i.e., $G_{min} = G_{max}$), as follows:

$$D^2 \times \{(G_{min}+H)^2 \times (G_{max}+H)^2\}/(G_{min}^2 \times G_{max}^2) \leq D^2 \times (G_{min}+H)^4/G_{min}^{4 \times 1/2}$$

This formula is rewritten as follows:

$$\{G_{max}/(G_{max}+H)\}^2 \geq 2 \times \{G_{min}/(G_{min}+H)\}^2$$

This formula is further rewritten to represent the aforementioned relationship as follows:

$$G_{max}/(G_{max}+H) \geq \sqrt{2} \times G_{min}/(G_{min}+H)$$

Figure 4:
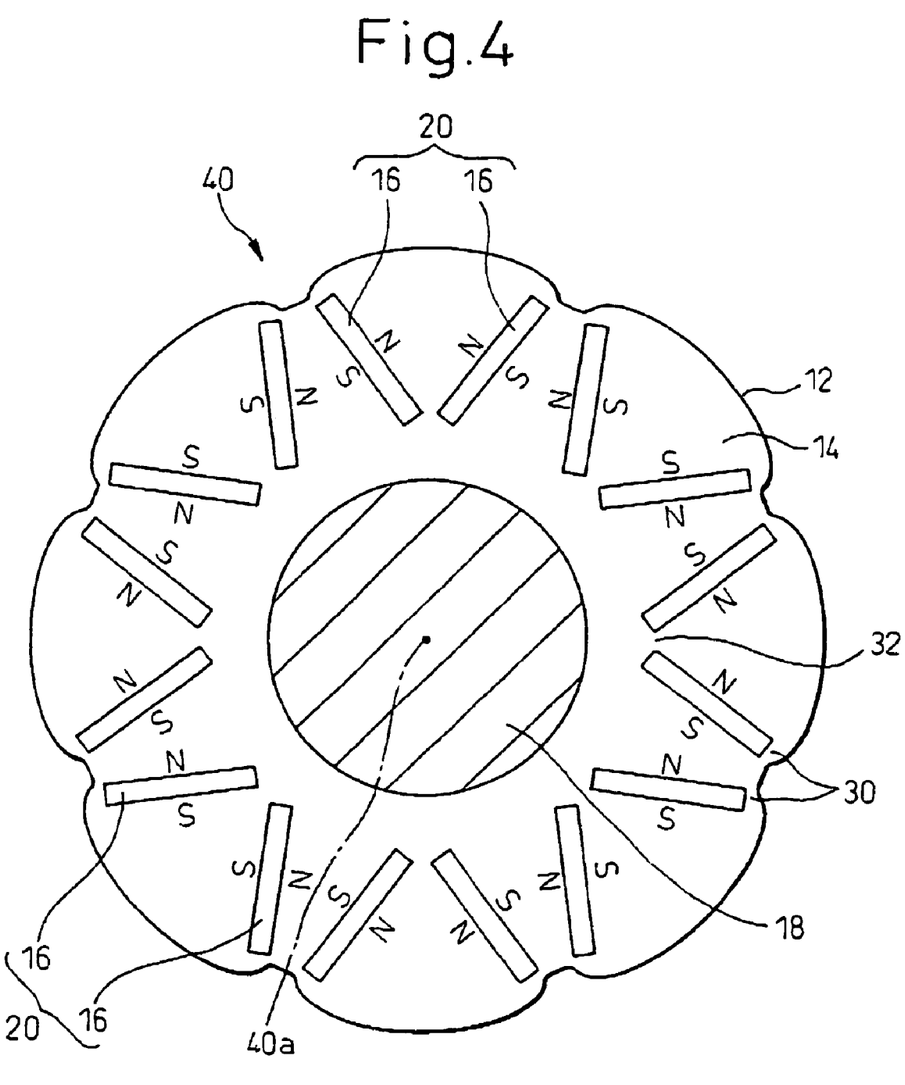
FIG. 4 is a cross-sectional view showing a rotor of a synchronous electric motor according to the second embodiment of the present invention.

FIG. 4 shows a rotor 40 of a synchronous electric motor, according to a second embodiment of the present invention, in a cross-section perpendicular to a rotation axis 40a. The rotor 40 according to the second embodiment has substantially the same configuration as the above-described rotor 10, except that the contour shape of the outer circumferential surface of the core is different therefrom. Therefore, corresponding components are denoted by common reference numerals, and the explanation thereof is not repeated.

In the rotor 40 according to the second embodiment, the contour of the outer circumferential surface 12 of the rotor core 14, at each of the N-poles and the S-poles, has at least partially a shape represented by a secant function (i.e., the inverse of a cosine function), as seen in the cross-section perpendicular to the rotation axis 40a. In the illustrated configuration, a portion of the outer circumferential surface 12 corresponding to each pole is provided substantially in its entirety with a bulging shape represented by the secant function. Alternatively, the portion of the outer circumferential surface 12 corresponding to each pole may be constructed such that the circumferentially center region thereof and the opposite lateral regions adjoining the center region have the bulging shape represented by the secant function, and circumferentially opposite end regions have a shape represented by the other curve.

The contour shape of the outer circumferential surface 12 at each pole of the rotor 40, as seen in the illustrated cross-section, may be represented by the following formula including a secant function in which the position of the rotation axis 40a is defined as an origin:

$$R = A - B \times \sec(C\theta) = A - B/\cos(C\theta)$$

In the above formula, R is a distance between the outer circumferential surface 12 and the origin, 2θ is a center angle for one pole, A is a value determined on the basis of the distance between the origin and the inner circumferential surface 24 of the stator core (i.e., the inner diameter of the stator core 26), B is a value determined on the basis of the center gap (i.e., a minimum gap $G_{min}$) in each pole of the rotor, and C is a value for determining the curvature of the secant function.

When the bulging shape represented by the above secant function is applied to the outer circumferential surface 12 of the rotor core 14 at each pole of the rotor 40, it is possible to increase the generated torque of the synchronous electric motor in a way similar to the rotor 10 (FIG. 1) which adopts the bulging shape represented by a hyperbolic cosine function as described above. Also, in the rotor 40, it is possible to effectively decrease a cogging torque generated during the rotation of the rotor, because the magnetic flux density at each pole varies smoothly in a sinusoidal form in the circumferential direction (see Table 1).

Figure 5:
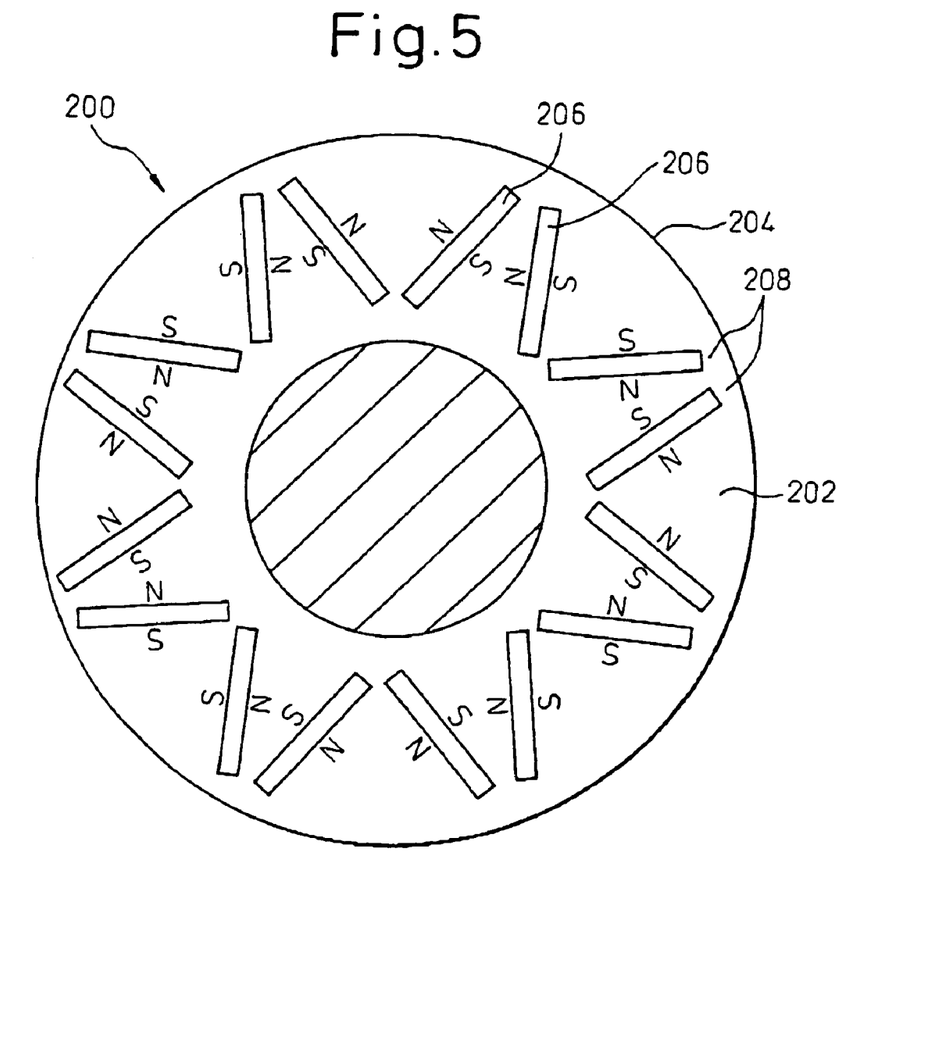
FIG. 5 is a cross-sectional view showing a rotor as a comparative example.

FIG. 5 shows a rotor 200, as a comparative example, in which the contour shape of the core outer circumferential surface is represented by a circular arc. In this rotor 200, as shown in Table 1, the cogging torque Q is significantly larger as compared to the rotor according to the present invention. This is considered to be due to the effect of the leakage magnetic flux passing through the thinner portions 208 of the rotor core 202 between the outer circumferential surface 204 of the rotor core 202 and the outer end of the respective permanent magnets 206 in a rotor radial direction.

Figure 6:
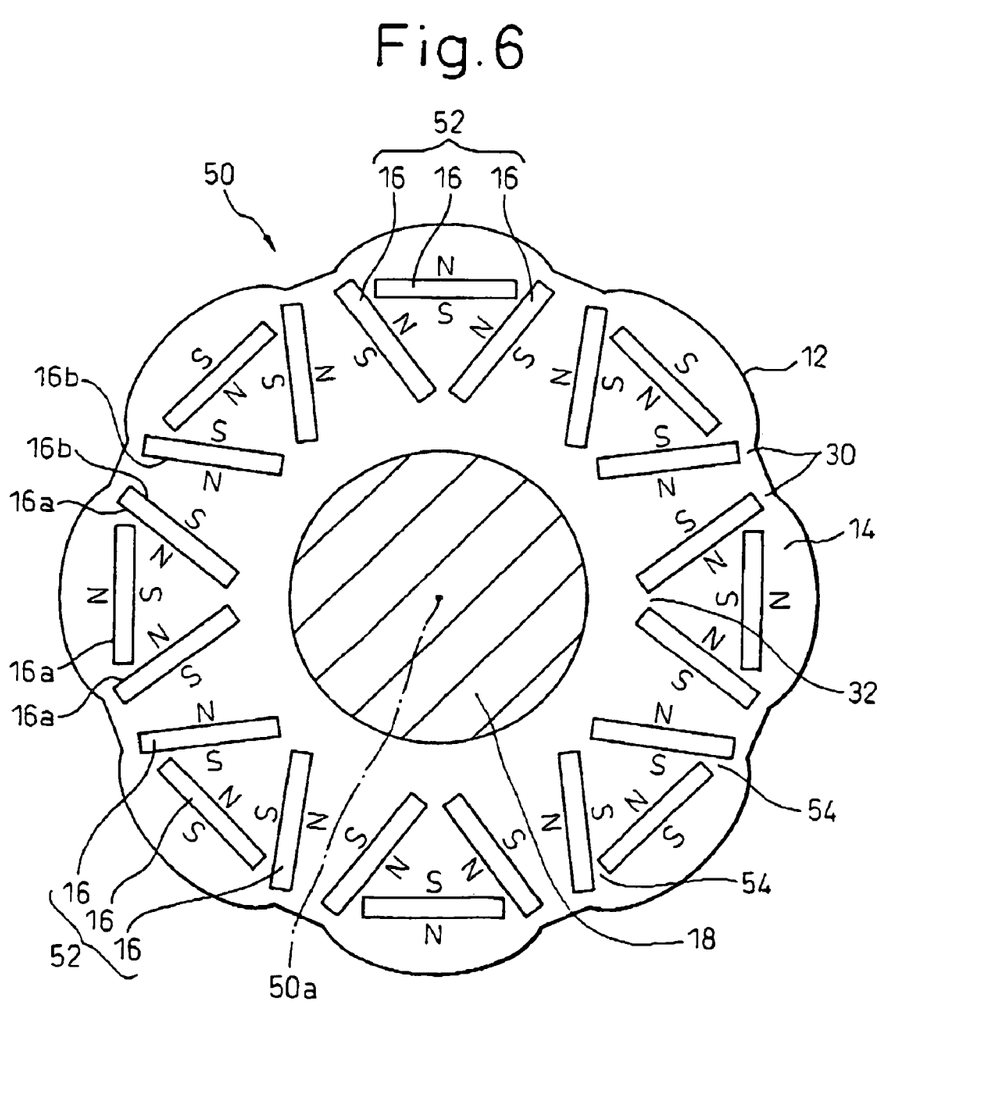
FIG. 6 is a cross-sectional view showing a rotor of a synchronous electric motor according to the third embodiment of the present invention.

FIG. 6 shows a rotor 50 of a synchronous electric motor, according to a third embodiment of the present invention, in a cross-section perpendicular to a rotation axis 50a. The rotor 50 according to the third embodiment has substantially the same configuration as the above-described rotor 10 according to the first embodiment, except that the configuration of each magnet set is different therefrom. Therefore, corresponding components are denoted by common reference numerals, and an explanation thereof is not repeated.

In the rotor 50 according to the third embodiment, each of the several magnet sets 52 composing the several poles includes a pair of permanent magnets 16 having a V-shaped configuration and converging toward each other at the portions thereof close to the rotation axis 50a, and an additional permanent magnet 16 disposed between the pair of permanent magnets 16. Just like a pair of permanent magnets 16 of each magnet set 20 of the rotor 10 according to the first embodiment, the V-shaped pair of permanent magnets 16 of each magnet set 52 are provided, on the front surfaces 16a obliquely facing to each other, with a mutually identical magnetic pole. Also, two permanent magnets 16 arranged side-by-side to each other in the magnet sets adjoining in the circumferential direction are provided, on the rear surfaces 16b facing to each other, with magnetic poles different from each other.

The additional permanent magnet 16 is disposed between the outer ends of the V-shaped pair of permanent magnets 16 as seen in the radial direction of the rotor core 14 (i.e., the ends close to the core outer circumferential surface 12). The additional permanent magnet 16 is provided, on the front surface 16a thereof close to the outer circumferential surface 12 of the rotor core 14, with a magnetic pole identical to that of the front surfaces 16a of the V-shaped pair of permanent magnets 16. In this manner, N-poles and S-poles are alternately formed in the circumferential direction on the outer circumferential surface 12 of the rotor core 14.

In the rotor 50, thinner portions 30, 32 are formed in the rotor core 14 in association with each magnet set 52, which are similar to the thinner portions 30, 32 of the rotor core 14 in the above-described rotor 10. Further, in the rotor 50, a pair of thinner portions 54 are formed between the outer ends of the V-shaped pair of permanent magnets 16 and the opposite ends of the additional permanent magnet 16. Through-holes are formed in the rotor core 14 to be adjacent to the thinner portions 30, 32, 54 for embedding individually the permanent magnets 16 in the rotor core 14. Thus, each permanent magnet 16 is firmly and securely supported in each through-hole by the thinner portions 30, 32, 54, against a centrifugal force exerted during the rotation of the rotor.

In the rotor 50, a part of a magnetic flux coming out from each permanent magnet 16 is a leakage magnetic flux passing through the thinner portions 30, 32, 54. However, the pair of permanent magnets 16 are arranged in the V-shape and the additional permanent magnet 16 is disposed therebetween in each magnet set 52, so that it is possible to increase a magnetic flux between the rotor and the stator 22 (FIG. 2), and thus to increase a generated torque, as already described. Further, as already described, it is possible to effectively decrease a cogging torque during the rotation of rotor by adopting the contour shape represented by the hyperbolic cosine function for the outer circumferential surface 12 of the rotor core 14. Similar effect can be obtained by adopting the contour shape represented by a secant function for the outer circumferential surface 12 of the rotor core 14.

Figure 7:
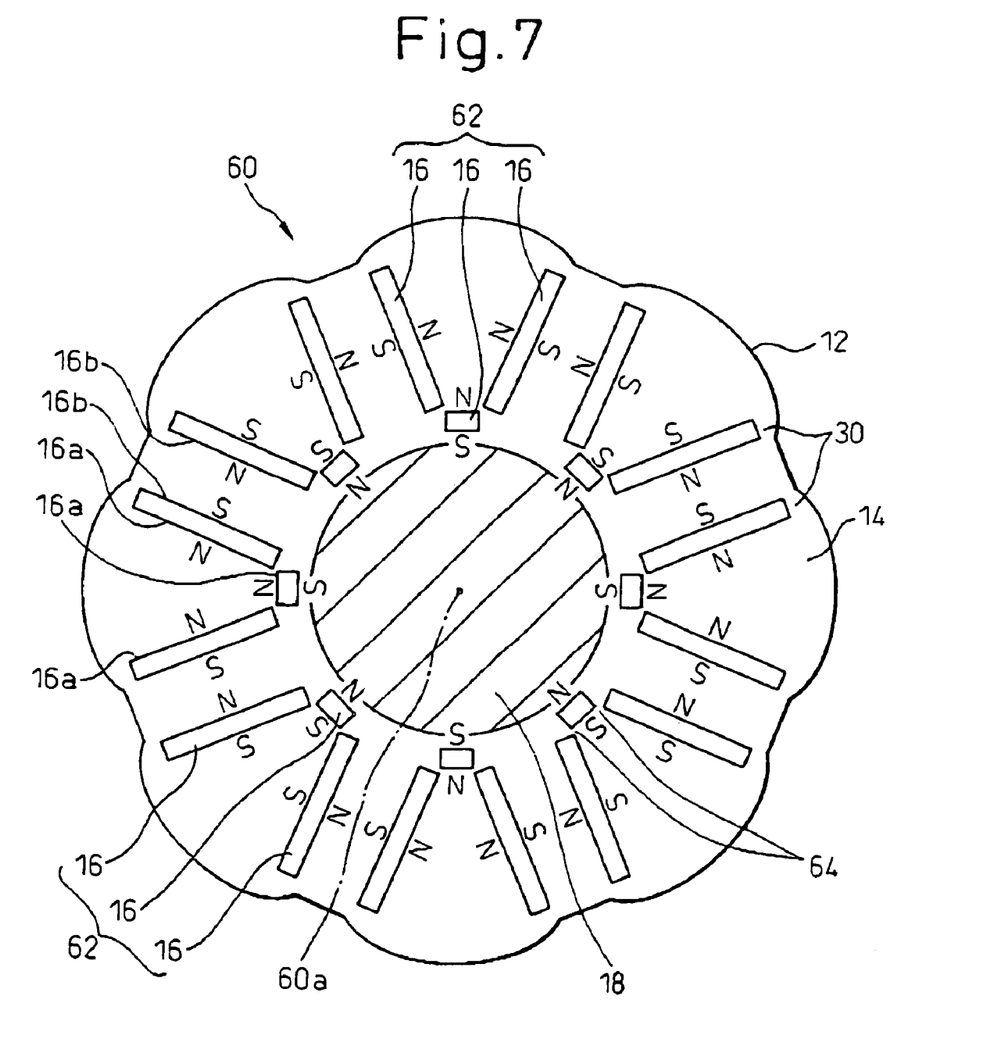
FIG. 7 is a cross-sectional view showing a rotor of a synchronous electric motor according to the fourth embodiment of the present invention.

FIG. 7 shows a rotor 60 of a synchronous electric motor, according to a fourth embodiment of the present invention, in a cross-section perpendicular to a rotation axis 60a. The rotor 60 according to the fourth embodiment has substantially the same configuration as the above-described rotor 10 according to the first embodiment, except that the configuration of each magnet set is different therefrom. Therefore, corresponding components are denoted by common reference numerals, and an explanation thereof is not repeated.

In the rotor 60 according to the fourth embodiment, each of the several magnet sets 62 composing the several poles includes a pair of permanent magnets 16 having a V-shaped configuration and converging toward each other at the portions thereof close to the rotation axis 60a, and an additional permanent magnet 16 disposed between the pair of permanent magnets 16. As are the pair of permanent magnets 16 of each magnet set 20 of the rotor 10 according to the first embodiment, the V-shaped pair of permanent magnets 16 of each magnet set 62 are provided, on the front surfaces 16a obliquely facing to each other, with a mutually identical magnetic pole. Also, two permanent magnets 16 arranged side-by-side to each other in the magnet sets adjoining in the circumferential direction are provided, on the rear surfaces 16b facing to each other, with magnetic poles different from each other.

The additional permanent magnet 16 is disposed between the inner ends of the V-shaped pair of permanent magnets 16 as seen in the radial direction of the rotor core 14 (i.e., the ends close to the rotation axis 60a). The additional permanent magnet 16 is provided, on the front surface 16a thereof close to the outer circumferential surface 12 of the rotor core 14, with a magnetic pole identical to that of the front surfaces 16a of the V-shaped pair of permanent magnets 16. In this manner, N-poles and S-poles are alternately formed in the circumferential direction on the outer circumferential surface 12 of the rotor core 14.

In the rotor 60, thinner portions 30 are formed in the rotor core 14 in association with each magnet set 62, which are similar to the thinner portions 30 of the rotor core 14 in the above-described rotor 10. Further, in the rotor 60, a pair of thinner portions 64 are formed between the inner ends of the V-shaped pair of permanent magnets 16 and the opposite ends of the additional permanent magnet 16. Through-holes are formed in the rotor core 14 to be adjacent to the thinner portions 30, 64 for embedding individually the permanent magnets 16 in the rotor core 14. Thus, each permanent magnet 16 is firmly and securely supported in each through-hole by the thinner portions 30, 64, against a centrifugal force exerted during the rotation of the rotor.

In the rotor 60, a part of a magnetic flux coming out from each permanent magnet 16 is a leakage magnetic flux passing through the thinner portions 30. In the rotor 60, however, unlike the rotor 50 (FIG. 6), the additional permanent magnet 16 is disposed at a position closer to the rotation axis 60a than the V-shaped pair of permanent magnets 16, so that no leakage magnetic flux is generated in the thinner portion 64. In addition, the pair of permanent magnets 16 are arranged in the V-shape and the additional permanent magnet 16 is disposed therebetween in each magnet set 62, so that it is possible to increase a magnetic flux between the rotor and the stator 22 (FIG. 2), and thus to increase a generated torque, as already described. Further, as already described, it is possible to effectively decrease a cogging torque during the rotation of the rotor by adopting the contour shape represented by the hyperbolic cosine function for the outer circumferential surface 12 of the rotor core 14. A similar effect can be obtained by adopting the contour shape represented by a secant function for the outer circumferential surface 12 of the rotor core 14.

While the invention has been described with reference to specific preferred embodiments, it will be understood, by those skilled in the art, that various changes and modifications may be made thereto without departing from the spirit and scope of the following claims.

The invention claimed is:

1. A synchronous electric motor comprising:
    a rotor having a rotation axis; and
    a stator surrounding said rotor through a gap;
    wherein said rotor includes a rotor core having an outer circumferential surface extending about said rotation axis and a plurality of permanent magnets attached to said rotor core to form plural poles along said outer circumferential surface of said rotor core;
    wherein said outer circumferential surface of said rotor core is provided, at each of said plural poles, with a contour deviating from a circular arc and bulging out in a radial outward direction, as seen in a cross-section perpendicular to said rotation axis;
    wherein said plurality of permanent magnets include a plurality of magnet sets individually assigned to said plural poles, each set including two or more permanent magnets; and
    wherein said gap between said rotor and said stator changes in dimension thereof along a circumferential direction of said outer circumferential surface of said rotor core; and wherein a maximum dimension of said gap $G_{max}$, a minimum dimension of said gap $G_{min}$ and a thickness H of each of said plurality of permanent magnets have a relationship meeting a formula of $G_{max}/(G_{max}+H) \geq \sqrt{2 \times G_{min}/(G+H)}$.

2. A synchronous electric motor as set forth in claim 1, wherein said contour of said outer circumferential surface of said rotor core, at each of said plural poles, has, at least partially, a shape represented by a hyperbolic cosine function, as seen in said cross-section perpendicular to said rotation axis.

3. A synchronous electric motor as set forth in claim 1, wherein said contour of said outer circumferential surface of said rotor core, at each of said plural poles, has, at least partially, a shape represented by a secant function, as seen in said cross-section perpendicular to said rotation axis.

4. A synchronous electric motor as set forth in claim 1, wherein each of said plurality of magnet sets includes a pair of permanent magnets having a V-shaped configuration and converging toward each other at portions thereof close to said rotation axis; and wherein said pair of permanent magnets are provided, on surfaces thereof obliquely facing to each other, with a mutually identical magnetic pole.

5. A synchronous electric motor as set forth in claim 4, wherein each of said plurality of magnet sets further includes an additional permanent magnet disposed between said pair of permanent magnets; and wherein said additional permanent magnet is provided, on a surface thereof relatively closer to said outer circumferential surface of said rotor core, with a magnetic pole identical to said magnetic pole of said surfaces of said pair of permanent magnets.

6. A synchronous electric motor as set forth in claim 5, wherein said additional permanent magnet is disposed between outer ends, close to said outer circumferential surface, of said pair of permanent magnets.

7. A synchronous electric motor as set forth in claim 5, wherein said additional permanent magnet is disposed between inner ends, close to said rotation axis, of said pair of permanent magnets.

8. A rotor of a synchronous electric motor comprising:
a rotor core provided on an outer circumferential surface thereof with a contour represented by a hyperbolic cosine function;
a plurality of permanent magnets embedded in said rotor core, two or more of said permanent magnets being provided per one pole of said rotor core; and
wherein a gap between said rotor and a stator changes in dimension thereof along a circumferential direction of said outer circumferential surface of said rotor core; and wherein a maximum dimension of said gap $G_{max}$, a minimum dimension of said gap $G_{min}$ and a thickness H of each of said plurality of permanent magnets have a relationship meeting a formula of $G_{max}/(G_{max}+H) \geq \sqrt{2 \times G_{min}/(G+H)}$.

9. A rotor of a synchronous electric motor comprising:
a rotor core provided on an outer circumferential surface thereof with a contour represented by a secant function;
a plurality of permanent magnets embedded in said rotor core, two or more of said permanent magnets being provided per one pole of said rotor core; and
wherein a gap between said rotor and a stator changes in dimension thereof along a circumferential direction of said outer circumferential surface of said rotor core; and wherein a maximum dimension of said gap $G_{max}$, a minimum dimension of said gap $G_{min}$ and a thickness H of each of said plurality of permanent magnets have a relationship meeting a formula of $G_{max}/(G_{max}+H) \geq \sqrt{2 \times G_{min}/(G+H)}$.

* * * * *